United States Patent [19]

Jorgensen

[11] Patent Number: 4,962,734
[45] Date of Patent: Oct. 16, 1990

[54] ELECTRICALLY DRIVEN, CIRCUMFERENTIALLY SUPPORTED FAN

[75] Inventor: Iner M. Jorgensen, Renton, Wash.
[73] Assignee: Paccar Inc., Bellevue, Wash.
[21] Appl. No.: 493,510
[22] Filed: Mar. 14, 1990
[51] Int. Cl.$^5$ .............................................. F01P 7/10
[52] U.S. Cl. ............................. 123/41.49; 123/41.12; 417/356; 165/51
[58] Field of Search ................... 123/41.12, 41.49; 165/51; 417/356, 423.7, 423.12, 423.14; 416/189 R, 170 R, 238, 192, 169 A; 415/104, 122.1, 124.1, 223; 310/89

[56] References Cited

U.S. PATENT DOCUMENTS

| | | | |
|---|---|---|---|
| 1,996,195 | 4/1935 | Ferguson | 230/273 |
| 2,697,986 | 12/1954 | Meagher, Jr. | 103/87 |
| 3,353,028 | 11/1967 | Braikevitch et al. | 290/52 |
| 3,394,682 | 7/1968 | Bensinger | 123/41.12 |
| 3,422,275 | 1/1969 | Braikevitch et al. | 290/52 |
| 3,700,358 | 10/1972 | Papst et al. | 417/354 |
| 4,025,831 | 5/1977 | Webb | 318/138 |
| 4,060,753 | 11/1977 | Okuyama et al. | 318/175 |
| 4,065,706 | 12/1977 | Gosling et al. | 318/254 |
| 4,123,666 | 10/1978 | Miller | 417/356 |
| 4,228,384 | 10/1980 | Arnold, Jr. et al. | 318/138 |
| 4,242,979 | 1/1981 | Shima | 415/124.1 |
| 4,257,554 | 3/1981 | Willingham | 236/35 |
| 4,358,245 | 11/1982 | Gray | 416/189 |
| 4,360,751 | 11/1982 | Arnold, Jr. et al. | 310/60 |
| 4,396,875 | 8/1983 | Yamauchi | 318/254 |
| 4,413,947 | 11/1983 | Seki | 415/182 |
| 4,428,719 | 1/1984 | Hayashibara et al. | 417/354 |
| 4,459,087 | 7/1984 | Barge | 123/41.12 |
| 4,553,075 | 11/1985 | Brown et al. | 318/254 |

*Primary Examiner*—Noah P. Kamen
*Attorney, Agent, or Firm*—Seed and Berry

[57] ABSTRACT

A circumferentially supported fan assembly for drawing cooling air through a radiator of a vehicle is described. The fan includes a fan ring extending circumferentially around the periphery of the fan, the blades of the fan extending from a central region to the fan ring. The entire weight of the fan is borne by a fan support assembly which extends around the periphery of the fan ring, outside the path of air flowing through the fan. The fan is the rotor of an electrically driven motor. A rotor flange of the fan ring extends transverse to the axis of the rotation of the fan, providing a greater torque advantage for the motor. An electrical control circuit selectively controls the speed of the fan to maintain the liquid temperature of the radiator below a selected threshold value. As additional cooling is required, the electronic controller gradually and smoothly increases the power drawn from the engine to turn the fan to increase its speed towards a selected speed. The air permeability of the fan when freewheeling is significantly increased because no central shaft or support structure blocks the airflow through the fan.

20 Claims, 2 Drawing Sheets

ELECTRICALLY DRIVEN, CIRCUMFERENTIALLY SUPPORTED FAN

DESCRIPTION

1. Technical Field

This invention relates to cooling systems for vehicles and, more particularly, to an electrically driven fan that is circumferentially supported and driven, thus providing greater airflow for increased cooling capacity.

2. Background of the Invention

Internal combustion engines, such as gasoline engines in cars and diesel engines in trucks, are usually liquid cooled. A fan pulls ambient air through a radiator to cool the liquid. In most vehicles, the fan is supported at its center on a shaft extending from the engine block and is coupled by a belt to the engine crankshaft.

Mechanically coupling the fan to the engine creates significant problems. The fan and the radiator are placed directly in front of the engine. Airflow out of the fan is blocked by the engine, an alternator, and other components, thus decreasing the airflow through the radiator and requiring a larger fan than would be necessary without such blockage. Because the fan is mounted to the engine block and the radiator is mounted to the frame, they often move relative to each other, requiring significant spacing between them. A shroud is sometimes placed around the fan to ensure that air pulled by the fan comes through the radiator, not around it. The shroud must be spaced sufficiently far from the fan blades that it is not struck as the blade rotates and engine vibrates. Spacing the fan from the radiator and shroud decreases the fan efficiency.

A disadvantage of driving the fan by belts from the crankshaft is that the fan always rotates proportional to engine speed. As the engine's speed increases or decreases, so does the fan's, independent of the cooling actually required. In large diesel trucks, maximum torque is developed at an engine speed well below maximum revolutions per minute (rpm), requiring greater cooling. In addition, the engine slows down when loaded, such as when the vehicle climbs a hill or the truck is full, slowing the fan down also and decreasing cooling capacity when it is needed most. Going down hills and on level runs, cooling by the fan is often not required; rather, airflow through the radiator as the truck travels provides sufficient cooling.

When sufficient cooling is provided by the ambient airflow, it is desirable to turn the fan off to conserve fuel. Presently, most large trucks have a clutched coupling between the engine and the fan. When cooling is required, the clutch engages to cause rotation of the fan. When cooling is not required, the clutch disengages, saving power. Clutch controls add complexity and weight to the system. In addition, the fan blades are stressed by being suddenly pulled on at full engine speed. The fan must be mechanically strong enough to withstand the repeated maximum stress occurring by being suddenly jerked on from a standstill, requiring additional weight and resistance to fatigue. Electrically driven fans for an internal combustion engine are known in the prior art per se. However, current designs of such fans still have significant drawbacks. Presently, the weight of the fan is supported by a central shaft which extends through the fan. Supporting the weight of the fan on a shaft extending through the center decreases fan efficiency for many reasons. When ambient air is forced through the radiator solely by the speed of the truck and the fan is not being driven by the engine, the central shaft blocks airflow and decreases cooling. The shaft support structure and fan blade support structure further decrease fan permeability and airflow when the engine fan clutch is not engaged.

SUMMARY OF THE INVENTION

In summary, the present invention includes a circumferentially supported fan assembly which draws cooling air through the radiator. The fan includes a fan ring extending circumferentially around the periphery of the fan, the blades of the fan extending from a central region to the fan ring. The entire weight of the fan is borne by a fan support assembly, which extends around the periphery of the fan ring, outside the path of air flowing through the fan. The fan support assembly is coupled to the same support frame region to which the radiator is coupled. The fan is the rotor of an electrically driven, brushless DC motor. A rotor flange of the fan ring extends transverse to the axis of the rotation of the fan, providing a greater torque advantage for the motor, and minimizing the power requirement for driving the fan. Coupling the radiator and the fan support assembly to a common frame region significantly reduces relative motion between the fan, the fan shroud, and the radiator, providing an increase in fan efficiency. Airtight seals are placed around the periphery of the fan, further increasing cooling efficiency.

An electronic control circuit selectively controls the speed of the fan to maintain the liquid temperature of the radiator below a selected threshold value. As additional cooling is required, the electronic controller gradually and smoothly increases the power drawn by the fan to increase its speed slowly toward a selected speed, thus avoiding rapid start-up stress.

DETAILED DESCRIPTION OF THE INVENTION

Figure 1:
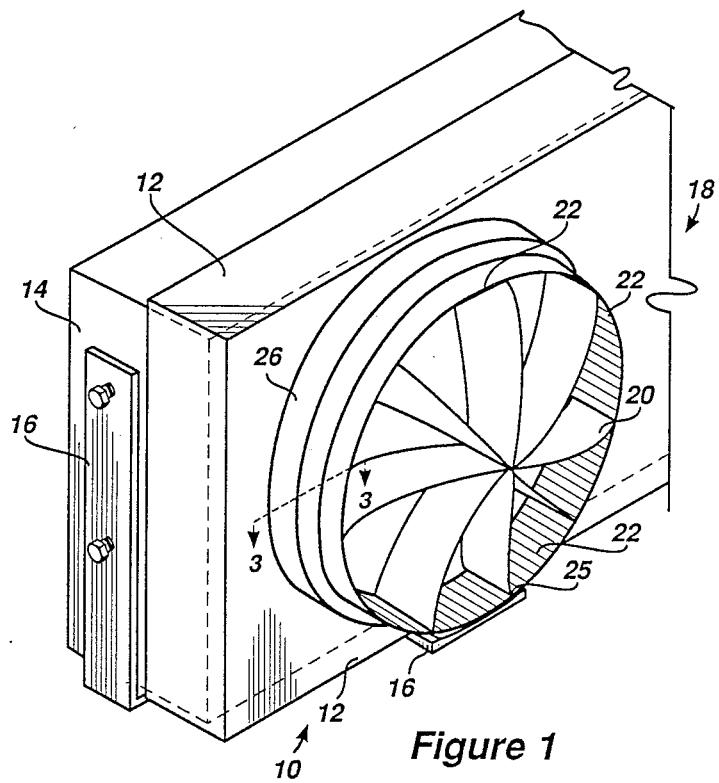
FIG. 1 is an isometric view of the fan, fan support assembly, and radiator coupled to a common support frame.

FIG. 1 illustrates a fan support assembly 10, a fan shroud 12, and a radiator 14. The fan support assembly 10 and radiator 14 are coupled to a common frame support region 16. In one embodiment, the frame support 16 is a unitary metal bracket to which both the radiator 14 and fan support member 10 are attached. In an alternative embodiment, the frame support region 16 includes different members coupled to a common frame region. The fan shroud 12 is coupled to the fan support member 10 and the radiator 14, the weight of the shroud being supported by both. Brackets (not shown) extend from the fan support assembly 10 to the radiator for increased stability. In one embodiment, the fan support assembly 10 is rigidly coupled to the radiator with the appropriate metal members, the radiator supporting the full weight of the fan and fan support members.

Figure 3:
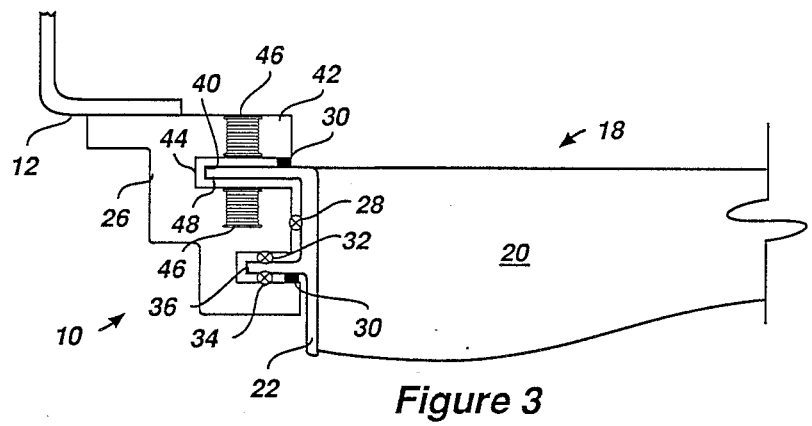
FIG. 3 is a cross-sectional view taken along lines 3—3 of FIG. 1.

As shown in FIGS. 1 and 3, a fan 18 is supported by the fan support assembly 10. The fan 18 includes a fan ring 22 and a plurality of blades 20 extending from a central region of the fan to the fan ring 22. The fan ring 22 extends circumferentially around the periphery of the fan, the tips 25 of each of the fan blades 20 being rigidly coupled to the fan ring 22. The fan ring 22 encloses the blades and is generally centered on the axis of rotation of the fan 18. The ring 22 preferably has a cross-sectional configuration that is thin in the radial direction while extending in the axial direction a distance approximately equal to the width of the tip of the fan blades 20. U.S. Pat. No. 4,358,245 to Gray, incorporated herein by reference, explains the advantages obtained by use of a fan ring. Besides adding structural strength to the fan 18 by supporting the blades 20 at their tips 25, air is held on the working surface of the blades 20. In particular, the ring 22 prevents air from flowing from the high-pressure working side of the blades to the low-pressure side by flowing around the outer ends of the blades.

Each blade 20 extends from a root end 24 at a central region of the fan to a tip region 25 which is rigidly secured to the ring 22. The roots 24 of the respective blades 20 are coupled to each other at the central region. There is no central shaft, hub, or other fixed member at the center of the fan. The central region of the fan is completely open and air permeable. The fan thus has a high permeability when freewheeling (that is, not being forcibly driven by the motor) so that it is particularly adapted for use in a vehicle. The full weight of the fan is carried by a fan support assembly 10, which extends circumferentially around the fan ring 22.

As best shown in FIG. 3, the fan support assembly 10 includes a plurality of bearings 28 extending between a support member 26 and the fan ring 22. The bearings 28 support the weight of the fan 18 and provide a smooth, substantially friction-free surface about which the fan rotates while its weight is supported. The bearings 28 may be of any suitable type known in the art for supporting rotating parts. For example, the bearings 28 may be recirculating ball bearings, roller bearings, spring-biased bearings, Teflon ® bearings, ceramic bearings, or air bearings. If the bearings used are air bearings, pressurized air pumped between the support member 26 and the fan ring 22 between the two air seals 30 supports the weight of the fan 18. Air bearings, Teflon ® or ceramic bearings may be suitable bearings because the fan is constructible from an extremely lightweight plastic, polystyrene, composite or other synthetic material. As explained later herein, the structure and use of the fan facilitates construction of an extremely lightweight fan, thus permitting suitable bearings to be selected from a larger group of bearings than would normally be used for a rotating fan of an automobile engine.

As shown in FIG. 3, extremely tight manufacturing and operational tolerances are obtainable on a fan manufactured according to the principles of the invention. The movement of the fan blades 20 and fan ring 22 relative to the fan support member 26 is precisely controllable. The fan 18 fits exactly within the selected locations of the fan support member 26. The shroud 12 can be rigidly coupled to both the fan support member 26 and the radiator 14 because both are coupled to generally the same frame member 16.

As shown in FIG. 1, the fan shroud 12 extends from the radiator 14 to the support assembly 10. Seals 30 coupled between the support member 26 and the ring 22 prevent the flow of air around the periphery of the fan. The radiator and fan are thus sealed as a single airtight unit; all air being pulled by the fan must be drawn through the radiator, significantly increasing the cooling capability of the fan for a given fan diameter. A significantly smaller fan may therefore be used to provide the same cooling as larger fans of the prior art because of the significant increase in efficiently drawing air through the radiator.

In one embodiment the fan shroud is open at the top and bottom or on the sides. In addition, the seals 30 are not present. Removal of seals 30 somewhat decreases the friction between the rotating fan 18 and the support assembly 26 while permitting some airflow around the outer ring of the fan. Aerodynamically shaping the ring 22 and minimizing the gap between the support member 26 and the fan 18 significantly reduces, to almost zero, the possibility of airflow around the fan, even though a seal is not present. For example, bearings 28 will likely block a significant portion of the airflow around the periphery of the fan, even if seals 30 are not present, the bearing 28 acting as a seal, and in some embodiments an airtight seal, between the fan 18 and the motor support member 26.

Supporting the fan 18 on the same frame support member 16 as the radiator 14 facilitates the obtaining of tight construction tolerances and increased fan efficiency over that possible in the prior art, as just described. In the prior art, as the engine vibrates, the fan also vibrates. When the vehicle strikes a road hazard, the radiator and shroud may move at a different time and rate than the engine. Thus, in the prior art, the fan shroud and radiator must be spaced sufficiently far from the tips of the fan blades that the fan does not strike either of them. If a fan blade strikes a stationary part, the results are generally catastrophic. In the prior art, as much as one or two inches must be left between the fan blades and any adjacent part, such as the fan shroud or the radiator, to accommodate for the relative motion between the fan (coupled to the engine) and the shroud and radiator (coupled to the frame). Significant airflow may therefore escape around the tips of the fan blades, reducing the efficiency of the fan. Further, air may recirculate around the blades, from the front to the back of the fan without passing through the radiator, further decreasing the efficiency of the fan. Because there is not an airtight seal between the radiator and the fan, air is drawn by the fan from around the sides and top of the radiator, further reducing the cooling ability of the fan.

As shown in FIG. 3, a stabilizing flange 36 extends into a slot 48 of the support member 26 to prevent fore-and-aft movement of the fan 18. The flange 36 contacts the bearings 32 and 34. As the fan draws air through the radiator, the thrust of the fan pushes the blade forward, slightly forcing it towards the radiator. Bearing 32 restrains forward movement of the fan parallel to its axis of rotation while bearing 34 prevents aft movement.

Fore-and-aft movement parallel to the axis of the fan was controlled differently in the prior art. First, most prior art fans are supported by a central shaft about which the fan rotates. A hub at either end of the shaft prevents the fan from moving significantly forward or backward along the shaft and locking washers on the shaft prevent the shaft from moving. Additionally, the distance between the fan blade and any adjacent object, such as the shroud or radiator, was sufficiently great for other reasons that slight fore or aft movement of the fan was not of concern. Because the fan of the present invention is supported in its periphery and the tolerances between surrounding components are relatively small, the use of bearings 32 and 34 to prevent fore-and-aft movement as the fan is turned on and off further controls the rotation of fan 18. The bearings 32 and 34 are of any suitable type, as previously described with respect to bearing 28.

Figure 2:
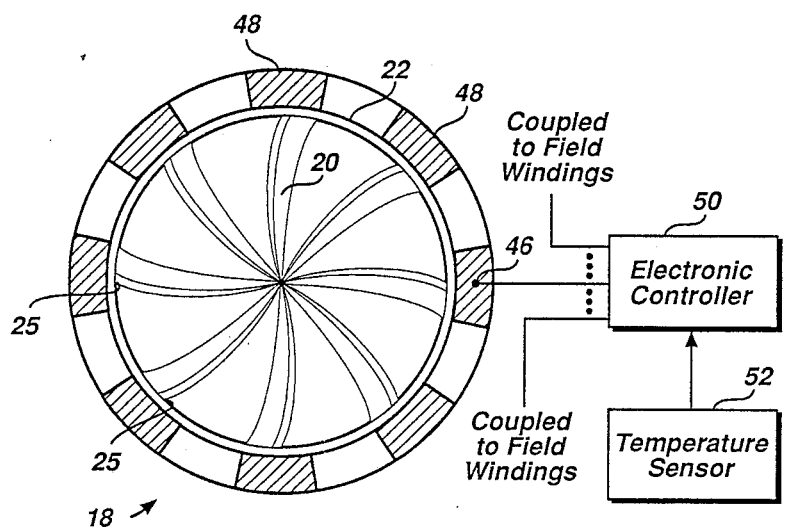
FIG. 2 is a front elevational view of the fan.

As shown in FIGS. 2 and 3, a rotor flange 40 extends from the fan ring 22 perpendicular to the axis of rotation of the fan. The flange 40 is within a slot 44 of the support assembly 26. On either side of the slot 44 are a plurality of field windings 46, shown in FIG. 4, evenly spaced circumferentially around the fan rotor 40. The entire fan 18, including the blades 20, ring 22, and flanges 40 and 36 are the rotor of the motor. The field windings 46 encased in the fan support member 26 are the stator.

Constructing an electric fan which has the ring and blades as the rotor of a motor with the field windings in the stator surrounding the fan is known in the art. For example, U.S. Pat. Nos. 4,553,075 to Brown et al. and 4,459,087 to Barge, incorporated herein by reference, both describe suitable electric driving motors in which the fan is the rotor and stationary field windings around the periphery of the fan are the stator. Any suitable driving circuit and electric motor arrangement including those described in the Barge and Brown et al. patents may be used for the electric drive motor of the fan 18, the basic principles of operation of control circuits for motors and fans being well known in the art.

As illustrated in FIGS. 2 and 3, the relative locations of the magnetic regions 48 of the rotor are significantly different in this fan than in fans of the prior art, providing additional advantages. The rotor flange 40 includes alternating magnetic regions 48, which could be a ferromagnetic material impregnated into a composite substrate, extending transverse to the axis of rotation of the fan 18. As shown in FIG. 3, the rotor flange 40 extends into a slot 44 in the support member 26 to permit the magnetic regions 48 to be acted on by the field windings to rotate the fan. The field windings 46 are sequentially energized at a selected rate to drive the fan 18 in rotation at the selected rate.

Having the stator field windings parallel to the axis of the fan and the magnetic regions 48 transverse to the axis of the fan provides significant advantages. First, the field windings may be placed a larger distance from the center of the fan, outward along a radius to provide a greater torque advantage for the motor, thus minimizing the power requirement. The rotor flange 40 may be significantly longer radially than the width of the fan blade 20, thus minimizing the total fan package thickness, if desired. The field windings are positioned on both sides of magnetic region 48, significantly increasing the area over which the drive force acts for driving the fan 18 as the rotor. Having the field windings on either side also provides balanced forces acting on the rotor for smooth rotation. In an alternative embodiment, the field windings 46 are placed only on one side, either fore or aft of the flange 40, and thus resembles the field winding placement of conventional motors. If the field windings are on a single side, they must be made correspondingly larger to provide the same drive force.

As shown in FIG. 2, electronic controller 50 selectively energizes the field windings 46 to control the driving force for the fan 18. One or more temperature sensors 52 within the liquid provide input to electronic controller 50. U.S. Pat. No. 4,133,105, incorporated herein by reference, describes temperature sensors for receiving inputs from an engine. The liquid is maintained below a selected temperature to cool the engine. When the temperature of the liquid exceeds a selected temperature, the controller 50 varies the input current to the field windings 46 to increase the rotational speed of fan 18. The fan 18 is driven at a selected speed based on the liquid temperature to provide the cooling required. The driving power provided is variable from zero to some maximum value as determined according to various design parameters for the individual vehicle and the required cooling thereof.

The drive power and rotation rate are gradually increased to smoothly and slowly increase the speed of the fan 18. One of the problems of the prior art clutch-engaged fans is the significant stress placed on the fan when suddenly jerked to a start as the clutch engages. In the prior art, the fan state is suddenly changed, from having no power applied thereto to having the maximum power being applied thereto, causing significant stress at the blade root and vibrations along the blades to the tips. Repeated "full power" starts place a significant stress on the blades, cause fatigue, and contribute to possible failure. To guard against such failure, the fan blades of the prior art must be significantly beefed up and made sufficiently strong to withstand such full-power starts over the life of the engine. The result is a significantly heavier fan with thicker fan blades at the root, providing even more weight for the engine to pull.

Another problem of clutch engaging fans is that sudden "step" loading is placed on the engine as the fan goes from drawing no power to pulling full starting power instantly. The step loading is frequently put on when the vehicle is climbing a hill and the engine is already fully loaded, thus causing additional power loss from the engine.

The present invention avoids these problems in the prior art of clutch-controlled fans. An electric motor inherently has some mechanical lag and builds up slowly to full speed. Stress on the fan blades is reduced by using an electric motor.

In one embodiment, the power drawn from the electrical system of the vehicle and applied to the fan 18 rises very smoothly and slowly. If electric power is suddenly pulled from the vehicle's electric system, the system's electric current balance is upset, placing stress on the system. Therefore, according to the alternative embodiment, the power drawn from the electrical system is slowly increased, from low power towards the selected maximum power. The controller 50 applies power at a smooth and constantly increasing rate, from zero to maximum, to the final maximum power. For example, the power transfer may increase from zero to maximum at a smooth climb and reach maximum after a one-minute time period. The rate of increasing the power drawn from the engine is selected based on the electrical system, the fan size, and the like. The rate of increasing (or decreasing) the power drawn off of the electrical system and applied to fan 18 is preset in electronic controller 50, either by analog resistors, capacitors, software, digital code in the controller, a timing means in a switch circuit, or the like. Variable rise time power supplies are known in the prior art per se, but their use in combination with a vehicle's electrically driven fan is not known or obvious from the prior art.

Sudden increases in the electrical loading on the vehicle's electrical system are thus avoided.

A fan constructed according to the invention has a relatively high air permeability when freewheeling. As the vehicle travels down the road, the speed of the vehicle is frequently fast enough that sufficient air for cooling the liquid is forced through the radiator by the vehicle's speed alone. When the ambient airflow, due to the speed of the vehicle, is sufficient to cool the liquid, the fan is off, thus conserving power. In this state, the fan is freewheeling. The air passing through the radiator must now perform work on the fan, causing the fan to rotate as it moves over the fan blades. One purpose of this invention is to increase, as far as possible, the time during which the fan is off and is not drawing power from the engine. This is increased by reducing to a minimum the resistance of the fan to the flow of air through the radiator as the vehicle travels along the road. In other words, having a high permeability when freewheeling reduces fan on time.

According to the principles of the present invention, the entire support assembly 10 for the fan 18 is positioned around the edges of the fan, out of the flow of the path of air through the fan. There is no central shaft, hub or other structure spreading across the front or the back of the fan blocking the airflow through the fan. The permeability, therefore, is extremely high. An extremely lightweight fan is used, which is easily turned by the passing air, further increasing the permeability of the fan. Because no central hub and adjacent support structure is present, the freewheeling permeability of the fan is further increased. The total mass of the fan which must be turned by passing air is reduced by not having a central hub and supporting shaft. Because the fan is not "step started" by being jerked to a full power on position, the blades weigh less, are thinner and more aerodynamic, further increasing the permeability of the fan. The off time of the fan 18 is thus much higher than is possible in the prior art.

Figure 6:
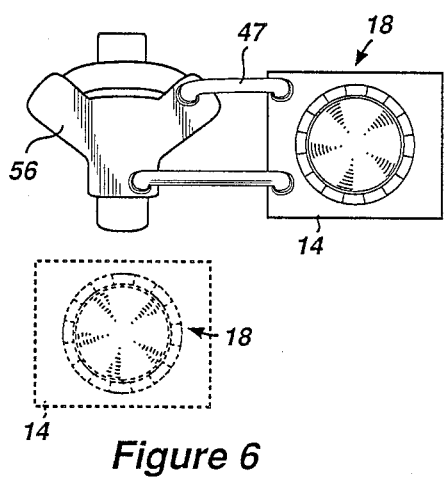
FIG. 6 is a block diagram of alternative radiator and fan placements relative to the engine and the vehicle.

As illustrated in FIG. 6, the engine 56 and fan 18 may be placed offset from each other, further increasing the permeability of air flowing through the radiator 14 and over the engine 56. In one embodiment, the radiator 14 and fan 18 are placed adjacent the engine 56 rather than directly in front of it, coupled by pipes 47 for carrying liquid. Alternatively, the fan 18 and radiator 14 are placed below (or above) the engine 56 with the appropriate liquid-filled pipes extending between them. Of course, the radiator 14 and fan 18 may be in front of engine 56 as is standard or may be in any other desired orientation.

Figure 4:
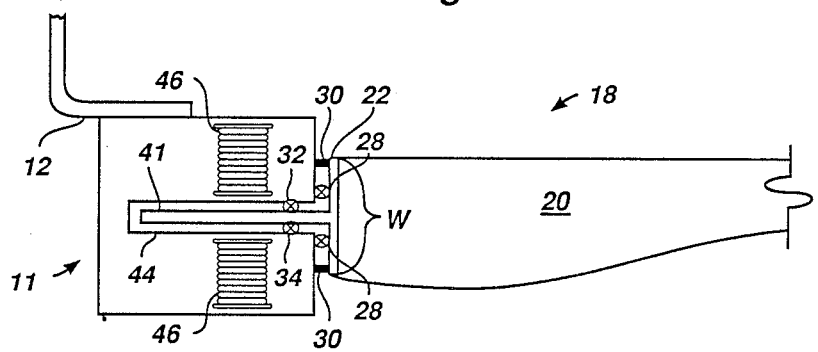
FIG. 4 is a cross-sectional view of an alternative embodiment of the fan rotor and drive mechanism taken along lines 3—3 of FIG. 1.

FIG. 4 illustrates an alternative embodiment of a fan support assembly 11. A single flange 41 extends from the ring 22 rather than the two flanges shown in FIG. 3. The single flange 41 is sufficiently long to provide a bearing surface against which bearings 34 and 32 ride to prevent fore-and-aft movement of fan 18. The flange 41 is also a rotor flange, having magnetic regions 48 therein which interact with fielding windings 46 as described with respect to flange 40. The fan support assembly 11 includes support bearings 28 on either side of flange 40 and the appropriate seals 30.

The flange 41 of FIG. 4 is longer than the width W of ring 22. The total fan package thickness can be significantly reduced by having relatively thin fan blades 20, the width W being small. For a thin fan blade 20, the width W of ring 22 may not be sufficiently great to provide the magnetic area for interaction with field windings 46 if they are placed according to the prior art structure as shown in U.S. Pat. No. 4,459,087, where windings are placed transverse to the fan axis instead of parallel. However, because the magnetic regions 48 are located on the rotor flange 40 which extends perpendicular to the ring 22, the area provided for applying power to the rotor is independent of the total fan thickness. The magnetic area 48 may be made as great or as little as necessary based on other design constraints. Because the fan is thinner, it weighs less, thus increasing the freewheeling permeability. The bearings 28, 32, and 34 support less weight and are lighter duty.

Figure 5:
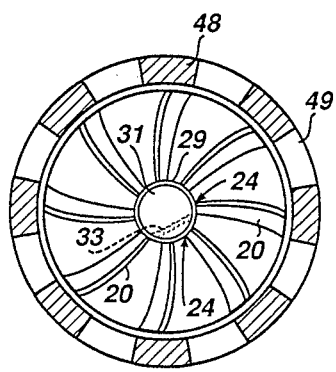
FIG. 5 is a front elevational view of an alternative embodiment of the central region of the fan.

FIG. 5 illustrates an alternative embodiment for the central region of fan 18. The roots 24 of the respective blades 20 are coupled to a shaft 29. The shaft 29 is of any desired diameter for providing convenient attachment of the roots 24. The shaft 29 is hollow, permitting forward airflow through the shaft while the fan is freewheeling. The shaft 29 thus merely provides a working surface to which the roots 24 are attached without decreasing the permeability of the fan. Because the entire weight of the fan is supported at the periphery, the shaft 29 is hollow and need not include bearings or other support structure.

In the alternative embodiment of FIG. 5, the shaft 29 includes a one-way valve 31. When the fan is freewheeling, the valve 31 is open, facilitating an increase in the air permeability of the fan in the freewheeling condition. When the fan is turned on and begins to draw air through the radiator, the force of air, or a light spring 33 pushes one-way valve 31 closed, preventing flow of air outward through the center portion of the fan 18. Because the central region of the fan has no shaft or other support structure, it is possible that the air pressure behind the fan near the center may be sufficiently low compared to air pressure at the tips of the fan that air actually flows from the back to the front at the center region of the fan while the fan is in operation drawing air inward at the tips of the blades. Valve 31 prohibits backward airflow during power operation of the fan while permitting substantially unrestrained airflow during freewheeling operation. Any easily openable one-way valve is suitable for use as the one-way valve 31 of the invention. A split diaphragm or a simple, hinged, circular flap-valve having no spring, or a light spring 33 biasing it to the closed position is sufficient. As air begins to flow through the shaft 29, the circular flap-valve is held open by the flow of the wind. If air is moving from the back to the front of the fan, the light spring in the flap-valve pulls the valve shut or air pushing from the back may close the valve. The harder air pushes, the tighter the valve 31 is held shut, preventing airflow backward, out of the central region of the fan.

A circumferentially supported fan has been shown and described with specific embodiments. Alternative embodiments have been described, although other embodiments may be produced by those of ordinary skill in the art, which are equivalent hereto and fall within the scope of this invention.

I claim:

1. A fan assembly for cooling air passing through a radiator, comprising:
   a road vehicle having an engine, a radiator, and a liquid circulating between said radiator and said engine, said radiator being mounted such that air passes therethrough as said vehicle moves;
   a fan support assembly coupled to said vehicle a fan coupled to said fan support assembly and supported thereby, said fan having blades extending from a central region to the periphery of said fan, said fan including a fan ring coupled to the tips of said blades and extending circumferentially around said fan, said fan support assembly extending circumferentially around said fan and completely out of the path of airflow through said fan;

bearing means within said fan support assembly for supporting the weight of said fan; and an electric drive means within said fan support assembly for electrically driving said fan.

2. The fan assembly according to claim 1, further including a flange extending from said ring and into said fan support assembly, said flange including magnetic regions to permit said fan to be electrically driven by field windings in said fan support assembly.

3. The fan assembly according to claim 2 wherein said flange extends perpendicular to the axis of rotation of said fan.

4. The fan assembly according to claim 3 wherein the length of said flange is greater than the width of said blades, said flange providing a greater area for being driver by said field windings than said ring provides, to facilitate construction of a thinner fan that is electrically driven.

5. The fan assembly according to claim 3 wherein field windings are placed on each side of said flange to smoothly drive said fan in a balanced manner.

6. The fan assembly according to claim 1, further including an airtight shroud extending from said radiator to said fan support assembly to prevent air from entering said fan without passing through said radiator.

7. The fan assembly according to claim 1, further including:

a sealing means between said support assembly and said fan for preventing airflow around the periphery of said fan.

8. The fan assembly according to claim 1, further including a temperature sensor within said liquid and an electronic control means for varying the speed of said fan to maintain the temperature of said liquid below a threshold level, said fan speed being independent of said engine's speed.

9. The fan assembly according to claim 8 wherein said electronic control means includes a start-up means for gradually increasing said fan's speed to a selected final speed to minimize the stress on said fan and a vehicle's electrical system caused by changes in power.

10. The fan assembly according to claim 1 wherein said fan includes an air permeable central region through which air may freely pass when said fan is not being electrically driven to reduce blockage of airflow through said radiator as said vehicle move along the road.

11. The fan assembly according to claim 10, further including a one-way valve in said central region which freely permits air to pass from the front to the rear of said fan but prevents air from passing from the rear to the front of said fan in said central region.

12. The fan assembly according to claim 1 wherein said bearing means is an air bearing.

13. The fan assembly according to claim 1 wherein said fan support assembly extends circumferentially around the periphery of said ring and supports the entire weight of said fan through said ring, said bearing being in contact with said ring around its periphery.

14. A fan assembly for cooling air passing through a radiator, comprising:

a road vehicle having an engine, a radiator, and a liquid circulating between said radiator and said engine, said radiator being mounted such that air passes therethrough as said vehicle moves;

a fan having a fan ring extending circumferentially around the periphery of said fan, said fan having blades extending from a central region to said ring;

a fan support assembly supporting said fan, said fan support assembly extending circumferentially around said fan ring and outside the path of air flowing through said fan such that airflow through said fan is not blocked by any portion of said fan support assembly;

bearing means between said fan ring and said fan support assembly; and a fan drive means adjacent said fan ring for driving said fan at a selected speed.

15. The fan assembly according to claim 14 wherein said fan drive means is an electric motor and said fan is a rotor of said motor and a stator of said motor is within said fan support assembly.

16. The fan assembly according to claim 15, further including an electronic control circuit means for applying power to said fan over the range of zero power to a selected maximum power and said circuit means includes a power transfer means for gradually increasing the power applied to said fan to prevent sudden changes in the loading on a vehicle's electrical system.

17. A method of cooling liquid that is circulating through a radiator which is coupled to the frame of a vehicle, comprising:

sensing the temperature of liquid within said radiator;

supporting a fan about its circumference for freewheeling rotation when said temperature is below said selected threshold value, said fan including an air permeable central region through which air may easily pass to cool said liquid by the flow of ambient air as said vehicle moves;

moving said radiator through the air and causing air to pass through said radiator as said vehicle moves;

passing air through a central region of said fan; and electrically driving said fan to draw additional air through said radiator when said temperature exceeds a selected threshold value.

18. The method according to claim 17 wherein the speed at which said fan is driven is variable and is selected based on a desired cooling rate of said liquid.

19. The method according to claim 17, further including:

gradually increasing the power transferred from said engine to said fan over a selected time period to reduce the stress on said engine of said power transfer.

20. The method according to claim 17, further including:

closing a valve in a central region of said fan when said fan is electrically driven to prevent air from moving from the rear to the front of said fan in said central region.

* * * * *

UNITED STATES PATENT AND TRADEMARK OFFICE
CERTIFICATE OF CORRECTION

PATENT NO.   :   4,962,734

DATED        :   October 16, 1990

INVENTOR(S)  :   Iner M. Jorgensen

It is certified that error appears in the above-identified patent and that said Letters Patent is hereby corrected as shown below:

In claim 4, column 9, line 24, please delete "driver" and substitute therefor, --driven--.

In claim 10, column 9, line 53, after "reduce" please insert --the--.

Signed and Sealed this

Seventh Day of January, 1992

Attest:

HARRY F. MANBECK, JR.

*Attesting Officer*   *Commissioner of Patents and Trademarks*